United States Patent [19]

Hobes et al.

[11] Patent Number: 5,145,923
[45] Date of Patent: Sep. 8, 1992

[54] PROCESS FOR THE PREPARATION OF ETHYLENE/VINYL ESTER COPOLYMERS

[75] Inventors: John V. Hobes, Dinslaken; Wolfgang Payer, Wesel; Werner Reimann, Duisburg, all of Fed. Rep. of Germany

[73] Assignee: Hoechst Aktiengesellschaft, Fed. Rep. of Germany

[21] Appl. No.: 716,958

[22] Filed: Jun. 18, 1991

[30] Foreign Application Priority Data

Jun. 29, 1990 [DE] Fed. Rep. of Germany ....... 4020639

[51] Int. Cl.$^5$ .......................................... C08F 218/02
[52] U.S. Cl. .................................... 526/193; 526/204; 526/208; 526/209; 526/212; 526/217; 526/331
[58] Field of Search ............... 526/331, 212, 209, 217, 526/193, 208, 204

[56] References Cited

U.S. PATENT DOCUMENTS

| | | |
|---|---|---|
| 4,048,411 | 9/1977 | Mietzner et al. .................... 526/331 |
| 4,091,200 | 5/1978 | Vandegaer .......................... 528/495 |
| 4,937,303 | 6/1990 | Wolf et al. ......................... 526/212 |

FOREIGN PATENT DOCUMENTS

| | | | |
|---|---|---|---|
| 1812094 | 6/1970 | Fed. Rep. of Germany ...... 526/331 |
| 2102469 | 8/1972 | Fed. Rep. of Germany . |
| 1394760 | 11/1963 | France . |
| 755167 | 8/1956 | United Kingdom . |
| 760178 | 10/1956 | United Kingdom . |
| 1436894 | 5/1976 | United Kingdom ................ 526/331 |

Primary Examiner—Joseph L. Schofer
Assistant Examiner—N. Sarofim
Attorney, Agent, or Firm—Jordan B. Bierman

[57] ABSTRACT

For the preparation of copolymers of ethylene, ethylene is polymerized with esters of vinyl alcohol in the absence of solvents and emulsifiers and in the presence of free radical acceptors. The addition of free radical acceptors makes it possible to increase the polymerization temperature in comparison to a procedure without the use of free radical acceptors.

23 Claims, No Drawings

PROCESS FOR THE PREPARATION OF ETHYLENE/VINYL ESTER COPOLYMERS

The invention relates to the preparation of copolymers of ethylene and esters of vinyl alcohol by polymerization of the corresponding monomers at pressures of at least 100 MPa and temperatures between 150° and 350° C. The reaction is carried out in the absence of a solvent or emulsifier, the reaction temperature, and hence the monomer conversion and the polymer yield, being increased by the addition of free radical acceptors to the monomer mixture.

BACKGROUND OF THE INVENTION

The copolymerization of ethylene with esters of vinyl alcohol in the absence of substantial amounts of a solvent or emulsifier is known. Thus, according to a process described in DE 21 02 469 Cl, the reaction of the monomers is carried out at pressures of up to 7,000 atmospheres, preferably between 1,500 to 3,000 atmospheres. The polymerization temperatures lie between 150° and 350° C., preferably between 200° C. and 325° C. Oxygen or compounds which decompose to give free radicals under the reaction conditions are used as polymerization initiators. A particular feature of this process is that it is carried out substantially in the absence of solvents or emulsifiers. As a rule, only negligible amounts of an inert liquid which serves as a solvent for the polymerization initiators are added to the reaction mixture. If oxygen is used as a catalyst, no solvents are required.

The very low maximum conversions which are achieved when the reaction mixture passes through the reaction zone once are a disadvantage of this known process. In the copolymerization of ethylene and vinyl acetate in an autoclave with stirring they are only about 20%. In industrial plants, the uncovered monomers are therefore recycled to the reactor.

The decisive factor for the level of conversion is the difference between the polymerization temperature and the temperature of the reaction mixture at the reactor inlet. At this temperature difference increases, the conversion increases or, expressed otherwise, the conversion depends directly on the polymerization temperature at constant reactor inlet temperature.

However, the amount of temperature increase in the polymerization reactor is subject limitations. Above a certain polymerization temperature, the reaction can no longer be controlled. This is due to thermal degradation of the polymer. Moreover, at high temperatures, ethylene may undergo spontaneous decompositions with formation of carbon, hydrogen, and also methane. Thus, in the processes of the prior art, in contrast to the wide temperature ranges of 150° C. to 350° C., a practical upper temperature limit of 300° C. is usually not exceeded in the polymerization of ethylene. The reaction temperature for the copolymerization of ethylene and vinyl esters is substantially lower and is dependent on the specific conditions in the polymerization apparatus. Thus, the maximum reaction temperature in the Example of the cited DE 21 02 469 (in the copolymerization of ethylene and lauryl acrylate) is 280° C., and only 260° C. in the copolymerization of ethylene and vinyl acetate.

SUMMARY OF THE INVENTION

It is, therefore, the object of the present invention to develop a procedure which allows the polymerization of ethylene with esters of vinyl alcohol to be carried out at higher temperatures in order to achieve higher conversions and yields.

This object is achieved by polymerization of ethylene with esters of vinyl alcohol, in the absence of solvents and emulsifiers, at pressures of at least 100 MPa, temperatures between 150° and 350° C., in the presence of free radical catalysts and/or oxygen and a molecular weight regulator. In the process, the polymerization is carried out with the addition of a free radical acceptor.

DETAILED DESCRIPTION OF THE INVENTION

Free radical acceptors (also refereed to as free radical inhibitors) are known additives for plastics (cf. for example in Ullmanns Encyclopadie der Technischen Chemie [Ullmann's Encyclopedia of Industrial Chemistry], 4th Edition, Vol. 15, page 253 et seq.). Their purpose is to stabilize polymers, regardless of chemical structure, composition, and molecular weight, in particular against the influence of heat, light, and oxygen. The use of free radical acceptors has to date been restricted to the finished polymer in the form of the raw material, the semifinished product, or the finished product. Their use in the polymerization process has not been considered to date.

Chemically, the free radical acceptors are phenols, aromatic amines, organic phosphites, and thioesters. The phenol-based free radical acceptors are monophenols, bisphenols, thiobisphenols, and polyphenols. Examples of these compounds are phenol, hydroquinone, resorcinol, pyrocatechol, o-, m- and p-cresol, 4-methoxyphenol, butyl-4-methoxyphenol, 2,2-di-tert-butyl-4-methylphenol and n-octadecyl 3-(3,5-di-tert-butyl-4-hydroxyphenyl)propionate. Among the amines, p-phenylenediamnes and diphenylamines have become particularly important. Typical examples are N-(1,3-dimethylbutyl)-N'-phenyl-1,4-phenylenediamine and 4-isopropyl-N'-phenyl-p-phenylenediamine. Phosphites have a dual function; they are themselves free radical acceptors and have a synergistic reinforcing effect on other free radical acceptors, in particular those derived from phenols. For example, tridecyl phosphite, triisooctyl phosphite, triphenylphosphite and tris-(2,4-di-tert-butylphenyl) phosphite are used. Thioesters are employed as synergistic agents, usually together with phenols. Conventional thioesters are dicetyl thiodipropionate, dilauryl thiodipropionate and distearyl thiodipropionate.

The reaction mechanism of free radical acceptors during polymerization is unknown. However, it is noteworthy that they do not stop the free radical-initiated synthesis of macrmolecules, for example by reaction with the catalytic free radicals.

In the process according to the invention, members of all classes of compounds described above, alone or as a mixture of two or more individual substances, may be used as free radical acceptors. Phenol derivatives and mixtures of phenol derivatives and organic phosphites are particularly suitable. Hydroquinone, 4-methoxyphenol, 2,6-di-tert-butyl-4-methylphenol and n-octadecyl 3-(3,5-di-tert-butyl-4-hydroxyphenyl)-propionate are preferred, alone or together with tris-(2,4-di-tert-butylphenyl)phosphite.

The free radical acceptors are added to the reaction mixture either in a solvent or preferably in solution in the commoner. The amount used is dependent on the type of free radical acceptor, the reaction temperature (higher temperatures generally require larger amounts than lower temperatures), and the composition of the monomer mixture. They are present in an amount of 10 to 10,000 ppm by weight, based on ethylene; the addition of 100 to 5,000 ppm by weight of free radical acceptors has proven particularly useful.

The free radical acceptors are only partly consumed in the course of the process. A portion is centrifuged from the reaction system or circulated together with the unconverted monomers. Another portion is fixed in the polymer and may remain therein as a desirable additive.

Esters of vinyl alcohol which preferably contain a total of 4 to 10 carbon atoms, for example vinyl acetate, vinyl propionate, vinyl butyrate and vinyl pivalate, are used as comonomers of ethylene. The polymerization can also be carried out in the presence of a plurality of comonomers instead of only one.

The polymerization is effected at pressures of at least 100 MPa and temperatures of between 150° and 350° C. Pressures of up to 700 MPa have proven particularly useful, the reaction preferably being carried out in the range of 150 to 300 MPa. Reaction temperatures which have proven suitable are in the range of 260° to 310° C., in particular 270° to 300° C.

The polymerization reaction is initiated by catalysts forming free radicals and/or by oxygen. Catalysts forming free radicals are understood as meaning the polymerization initiators known for the high pressure polymerization of ethylene, e.g. peroxides, hydroperoxides, and azo compounds. Examples of these classes of substances are di-tert-butyl peroxide, tert-butyl peroxypivalate, butyl peroxybenzoate, tert-butyl hydroperoxide, cumyl hydroperoxide, and azobisisobutyronitrile. It is possible to use mixtures of 2 or more peroxides, or 2 or more azo compounds. Also useful are mixtures of oxygen with either peroxides or azo compounds. The catalysts forming free radicals are used in an amount of 10 to 10,000 ppm by weight, based on ethylene, depending on the reaction temperature and on the composition of the monomer mixture. In order to introduce the catalysts into the reaction space, they are dissolved in a suitable solvent, particularly benzene, cyclohexane, or isooctane. The same liquids are also suitable as solvents for the free radical acceptors. When oxygen is used, it is added to the reaction mixture in amounts of 1 to 100 ppm by weight, based on ethylene.

The copolymerization of the monomers is carried out in the presence of a polymerization regulator. For example, saturated or unsaturated hydrocarbons, alcohols, aldehydes and ketones, preferably aldehydes, especially propionaldehyde, have proven suitable. The purpose of the polymerization regulator is to influence the molecular weight of the polymers. By adding these compounds in a suitable amount (0.05 to 10% by weight, based on ethylene is usual, depending on the type of regulator), the molecular weight of the polymers can be adjusted to the desired value.

The copolymerization is carried out in apparatus conventionally used for the polymerization of ethylene alone or together with other monomers under high pressure and at high temperature. In this context, reference may be made to Ullmanns Encyclopadie Ter Technischen Chemie [Ullmann's Encyclopedia of Industrial Chemistry], 4th Edition, Volume 19, page 169 et seq. (1980).

The polymerization can be carried out continuously or batchwise. Carrying out the process continuously in tube reactors has proven particularly suitable. In this embodiment, a mixture of ethylene, one or more comonomers, the polymerization regulator, and the free radical acceptor is introduced at the reactor inlet and optionally at one or more further points (side branches) of the reactor. The polymerization initiator can likewise be introduced into the reactor either in total with the monomers at the inlet or in portions via the side branches. The residence time of the reaction mixture in the reactor is 30 to 180 seconds.

The average molecular weight $\overline{M}_n$ of the polymers obtained by the process according to the invention is between 1,000 and 5,000 g/mol, determined by vapor pressure osmometry. The ethylene copolymers obtained by the process according to the invention are used as additives for mineral oil and mineral oil fractions, in particular middle distillates, for improving the flow.

The Examples which follow illustrate the invention but do not restrict it.

EXAMPLES 1 TO 6

An autoclave having a volume of about 0.5 liters and equipped with a high speed stirrer was used for carrying out the experiments summarized in Table 1 and performed by continuous procedure. Ethylene was metered into the autoclave via a piston compressor, and the vinyl acetate, initiator solution, and propionaldehyde used as a molecular weight regulator were introduced by means of membrane pumps. The pressure was set via the bottom discharge valve of the autoclave and the jacket temperature established by means of electric heating. The limiting polymerization temperature was controlled by varying the amount of the initiator and the free radical acceptor used.

The vinyl acetate content in the polymer was determined by the pyrolysis method. For this purpose, 200 mg of the polymer were heated with 30 mg of pure polyethylene in a pyrolysis flask for 5 minutes at 450° C., and the cleavage gases were collected in a 250 ml round-bottomed flask. The acetic acid formed was reacted with an NaI/KIO$_3$ solution, and the iodine liberated was titrated with Na$_2$S$_2$O$_3$ solution.

Examples 1 to 4 relate to the process according to the invention, i.e. the polymerization with the addition of free radical acceptors; limiting temperatures of 270° to 275° C. were reached.

The polymerization in the absence of free radical acceptors is described in Example 5. The maximum achievable polymerization temperature at which no decomposition occurred was 260° C.

Compared with Example 5, Examples 1 to 4 show that the limiting polymerization temperature can be increased by the addition of free radical acceptors to the reaction mixture and an increase of between 9 and 31% in the yield is achieved.

In Example 6, a polymerization experiment was carried out at a relatively high temperature without the addition of a stabilizer. Under the stated conditions, polymerization was not possible owing to the considerable temperature increase.

TABLE 1

| | Examples | | | | | |
|---|---|---|---|---|---|---|
| | 1 | 2 | 3 | 4 | 5 | 6 |
| Limiting polymerization temperature [°C.] | 275 | 270 | 270 | 270 | 260 | 270 |
| Pressure [MPa] | 150 | 150 | 150 | 150 | 150 | 150 |
| Ethylene throughput [kg/h] | 8.0 | 8.0 | 8.0 | 8.0 | 8.0 | 8.0 |
| Vinyl acetate throughput [kg/h] | 3.91 | 3.91 | 3.91 | 3.91 | 3.91 | 3.91 |
| Propionaldehyde [ml/h] | 215 | 240 | 210 | 215 | 340 | 300 |
| Initiator[a] | | | | | | |
| Type | A | B | B | B | B | B |
| Amount [ppm, based on $C_2H_4$] | 85 | 124 | 100 | 56 | 317 | 100 |
| Free radical[b] acceptor | | | | | | |
| Type | C | D | E | F | — | — |
| Amount [ppm by wt., based on $C_2H_4$] | 1020 | 2050 | 2050 | 410 | — | — |
| Polymer discharge [kg/h] | 2.81 | 2.98 | 3.10 | 3.36 | 2.60 | — |
| Vinyl acetate content [% by weight] | 27.7 | 28.2 | 28.4 | 28.0 | 28.6 | — |
| Melt viscosity at 140° C. [mPa.s] | 250 | 260 | 240 | 260 | 220 | — |
| Polymer yield [%] | 23.3 | 24.6 | 25.6 | 27.8 | 21.3 | — |
| Average molecular weight $M_n$ [g · mol$^{-1}$] | 1950 | 2015 | 1890 | 1966 | 1853 | — |

[a] A tert-Butyl peroxypivalate
B tert-Butyl peroxybenzoate
[b] C Hydroquinone
D 4-Methoxyphenol
E 2,6-Di-tert-butyl-4-methylphenol
F A mixture of 4 parts by weight of tris-(2,4-di-tert-butyl-4-hydroxyphenyl) phosphite and 1 part by weight of n-octadecyl 3-(3,5-di-tert-butyl-4-hydroxyphenyl)-propionate

What we claim is:

1. A process for the polymerization of monomers ethylene with esters of vinyl alcohol in the absence of solvents and emulsifiers for said monomers at pressures of at least 100 MPa and temperatures between 150° C. and 350° C. in the presence of a molecular weight regulator, catalysts forming free radicals and/or oxygen, there being at least one free radical acceptor present during the polymerization.

2. The process of claim 1 wherein said free radical acceptor is selected from the group consisting of phenols, phenol derivatives, aromatic amines, organic phosphites, and mixtures thereof.

3. The process of claim 1 wherein said free radical acceptor is a combination of said phenols and/or said phenol derivative with said organic phosphites.

4. The process of claim 3 wherein said free radical acceptor is selected from the group consisting of hydroquinone, 4-methoxyphenol, 2,6-di-tert-butyl-4-methylphenol, n-octadecyl 3-(3,5-di-tert-butyl-4-hydroxyphenyl)propionate, tris-(2,4-di-tert-butyl-phenyl)-phosphite, and mixtures thereof.

5. The process of claim 4 wherein said free radical acceptor is a mixture of at least one of said hydroquinone, 4-methoxyphenol, 2,6-di-tert-butyl-4-methylphenol, n-octadecyl 3-(3,5-di-tert-butyl-4-hydroxyphenyl)propionate, with said phosphite.

6. The process of claim 1 wherein said free radical acceptor is in a concentration of 10 to 10,000 ppm by weight, based on said ethylene.

7. The process of claim 6 wherein said concentration is 100 to 5,000 ppm by weight.

8. The process of claim 1 wherein said oxygen is present in an amount of 1 to 100 ppm by weight, based on said ethylene.

9. The process of claim 1 wherein said pressures are up to 700 MPa.

10. The process of claim 1 wherein said temperatures are 260° C. to 310° C.

11. The process of claim 9 wherein said pressures are 150 to 300 MPa and said temperatures are 270° C. to 310° C.

12. The process of claim 1 wherein said free radical acceptor is selected from the group consisting of monophenols, bisphenols, thiobisphenols, polyphenols, p-phenylenediamines, diphenylamines, and organic phosphates.

13. The process of claim 1 wherein said free radical acceptor is selected from the group consisting of phenol, hydroquinone, resorcinol, pyrocatechol, o-, m- and p-cresol, 4-methoxyphenol, butyl-4-methoxyphenol, 2,2-di-tert-butyl-4-methylphenol, n-octadecyl 3-(3,5-di-tert-butyl-4-hydroxyphenyl)propionate, N-(1,3-dimethylbutyl)-N'-phenyl-1,4-phenylenediamine, 4-isopropyl-N'-phenyl-p-phenylenediamine, tridecyl phosphite, trisooctyl phosphite, triphenyl phosphite, tris-(2,4-di-tert-butylphenyl) phosphite, dicetyl thiodipropionate, dilaurylthiodipropionate, distearyl thiodipropionate, and mixtures thereof.

14. The process of claim 1 wherein said esters of vinyl alcohol contain 4 to 10 carbon atoms.

15. The process of claim 14 wherein said esters are selected from the group consisting of vinyl acetate, vinyl propionate, vinyl butyrate, vinyl pivalate, and mixtures thereof.

16. The process of claim 1 wherein said regulator is selected from the group consisting of saturated and unsaturated hydrocarbons, alcohols, aldehydes, ketones and mixtures thereof.

17. The process of claim 16 wherein said regulator is an aldehyde.

18. The process of claim 17 wherein said regulator is propionaldehyde.

19. The process of claim 1 wherein said regulator is present in an amount of 0.05% to 10% by weight, based on said ethylene.

20. The process of claim 1 wherein said catalysts are peroxides, hydroperoxides, azo compounds, oxygen, mixtures of at least two peroxides, mixtures of at least two azo compounds, and mixtures of oxygen with peroxides or azo compounds.

21. The process of claim 1 wherein said catalysts are selected from the group consisting of di-tert-butyl peroxide, tert-butyl peroxypivalate, butylperoxybenzoate, tert-butyl hydroperoxide, cumyl hydroperoxide, azobisisobutyronitrile.

22. The process of claim 1 wherein a solvent for said catalysts and/or said free radical acceptor is present.

23. The process of claim 22 wherein said solvent is selected from the group consisting of benzene, cyclohexane, and isooctane.

* * * * *